L. G. DANIELS.
LATHE DOG.
APPLICATION FILED JUNE 16, 1919.
1,331,003.
Patented Feb. 17, 1920.
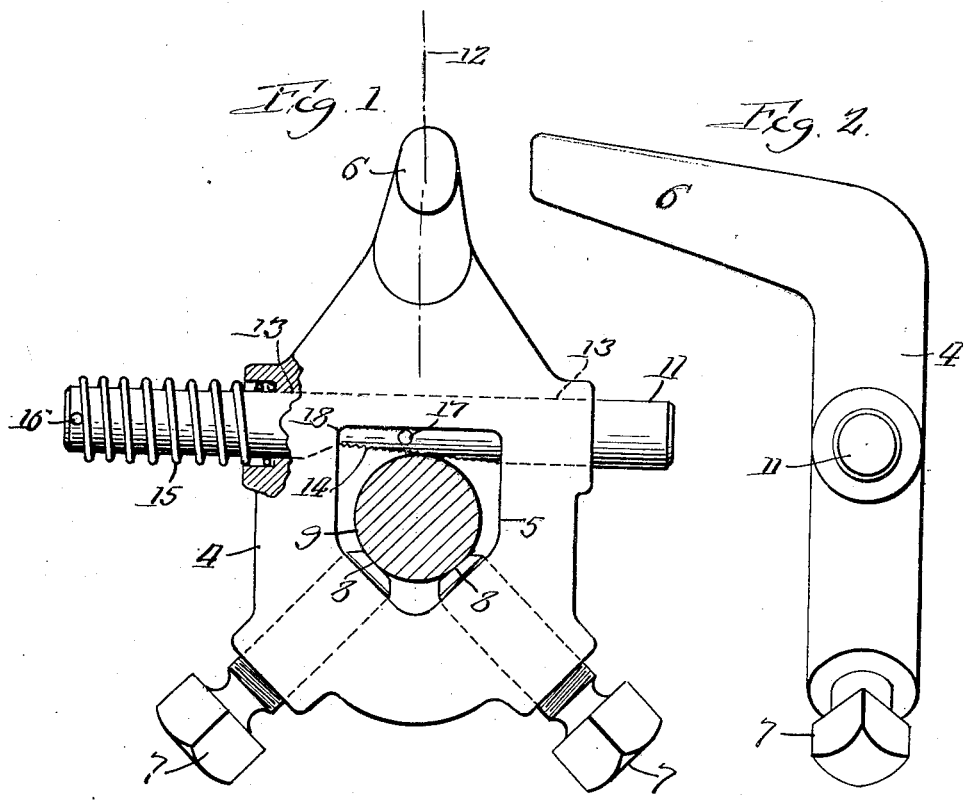
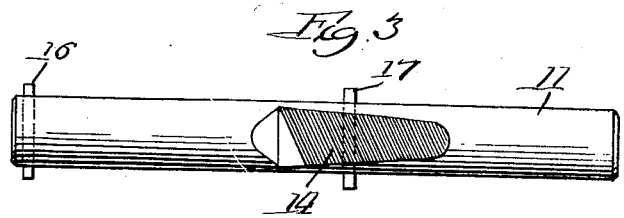
Inventor:
Lee G. Daniels
By Ira J. Wilson
Atty.

UNITED STATES PATENT OFFICE.

LEE G. DANIELS, OF ROCKFORD, ILLINOIS.

LATHE-DOG.

1,331,003. Specification of Letters Patent. Patented Feb. 17, 1920.

Application filed June 16, 1919. Serial No. 304,399.

*To all whom it may concern:*

Be it known that I, LEE G. DANIELS, a citizen of the United States, residing at Rockford, in the county of Winnebago and State of Illinois, have invented certain new and useful Improvements in Lathe-Dogs, of which the following is a specification.

This invention pertains to dogs such as are used in machine shops for gripping and holding cylindrical work, and has more particular reference to that class commonly known as lathe dogs.

The primary object of the present invention is to provide a lathe dog characterized by the inclusion of novel means for automatically gripping and holding the work for turning it in a lathe or any other machine. My invention further contemplates the provision of a self-gripping means of such simple and improved construction as to obtain a very effective gripping and releasing action for the purpose of expediting the handling of work in lathes and other machines, especially where the work has to be mounted and remounted many times in a day.

Another object of my invention resides in the provision of a lathe dog so constructed as to be thoroughly practical and possessing ample strength for all service requirements, and which is so designed as to be capable of production at a comparatively low cost.

With these objects in view, I have devised a lathe dog consisting generally stated, of a stock provided with the usual driving tail and an eye, a pair of convergent set screws entering one side of the eye, and a gripping bar mounted in a very substantial manner to slide longitudinally in bearings in the stock and presenting a gripping surface in a novel manner to the eye, and a spring constantly urging the bar in a direction to grip the work interposed between the set screws and gripping surface. This organization of parts gives exceptional results, as will be appreciated after a more thorough understanding of the invention.

Referring to the drawing,—

Figure 1 is a face view of a lathe dog embodying my improvements;

Fig. 2, a side view thereof; and

Fig. 3, a view of the locking bar removed from the stock.

The stock designated generally by character 4 is shaped to provide an eye 5 and a driving tail 6. A pair of convergent set screws 7 threadingly engaged in the stock enter the eye 5 at one side thereof and provide adjustable seats 8 upon which the work 9 is adapted to rest, as shown. A rod 11 passes through the stock at right angles to the major axis thereof which is indicated by the dotted line 12. It will be observed that this bar is substantially mounted in bearings 13 in the stock at each side of the eye 5 and that the bar intersects the eye 5 and is shaped to provide a gripping surface designated generally by the character 14. This gripping surface is disposed preferably in a flat plane inclined with respect to the longitudinal axis of the rod 11, approximately four degrees. This surface is serrated to provide teeth extending transversely of the bar in an oblique plane, as shown clearly in Fig. 3, so that the stock will be engaged by a plurality of teeth, thus preventing the latter from digging and marring the stock as occurs when the teeth extend at right angles to the longitudinal axis of the bar. An expansion spring 15 coiled about a projecting end of the rod 11 and interposed between the stock and a suitable abutment 16 on the bar constantly urges the bar lengthwise in a direction to bring its gripping surface 14 into wedging engagement with the work 9. A stop 17 on the bar will, by contact against the inner wall of the eye, prevent displacement of the bar under influence of the spring 15 when the work is removed.

In use, the set screws 7 are adjusted to accommodate work of a given diameter, that is, so that the work may be freely inserted between the ends 8 of the set screws and the surface 14 of the bar 11 when the latter is moved lengthwise against the tension of the spring to a retracted position to provide sufficient opening between said set screws and surface 14. The bar is retracted by simply pressing in on the spring-equipped end thereof, and upon withdrawing this pressure the spring will move the bar lengthwise in the opposite direction, thereby bringing its surface 14 into gripping relation to the work. When now the work is placed in a lathe or other machine, centered, and the driving tail 6 turned in a counterclockwise direction viewing Fig. 1, a wedging engagement would be effected between the surface 14 and the work, the gripping effect of which will be increased in proportion to the increase in power applied to the driving tail.

Consequently, the harder the drive, the more securely the work will be gripped and held by my improved lathe dog; and, due to the arrangement of the gripping teeth, there is no danger of marring the work. The work may be instantly withdrawn when the dog is stopped by simply pressing in on the bar 11 to release the gripping surface, as will be obvious. It will be noted that the bar 11 has considerable bearing on the stock from end to end thereof, and it is thus supported in a very rigid and substantial manner to effectually withstand the side thrust imposed by reason of the wedging engagement with the work. By employing a single straight bar or gripping rod operating in a bored hole in the stock which provides a substantial bearing for the bar, an exceptionally simple, durable and practical construction is obtained.

It is believed that the foregoing conveys a clear understanding of my invention and of the objects prefaced above, and while I have illustrated and described but a single working embodiment thereof, it should be understood that various changes might be made in details of construction without departing from the spirit and scope of the invention as expressed in the appended claims, in which—

I claim:

1. A lathe dog comprising a stock having an eye and a driving tail, a pair of convergent set screws entering the eye, a gripping bar slidable lengthwise in bearings in the stock on the opposite sides of the eye and having an inclined gripping face within the eye and opposed to the ends of the set screws therein, and a spring for constantly urging said bar lengthwise in a direction to bring the gripping face into operative engagement with a piece of work interposed between said ends of the set screws and said face.

2. A lathe dog comprising a stock having an eye, and a gripping member slidable on the stock in a plane transverse to the major axis of the dog and shaped to provide a gripping face disposed in said eye and inclined with respect to the longitudinal axis of the bar, and a spring constantly urging the bar lengthwise to bring its gripping face into operative relation to the work.

3. A lathe dog comprising a stock having an eye and a driving tail, a pair of convergent set screws threadingly engaged in the stock and entering the eye, a gripping bar slidable lengthwise in bearings on the stock at opposite sides of the eye and so arranged that the gripping surface of the bar is presented to the eye and opposed to the inner ends of the set screws, and a spring constantly urging the bar lengthwise to bring its gripping face into operative engagement with the work interposed between said face and the set screws.

4. In a lathe dog, the combination of a stock equipped with a pair of convergent set screws entering the eye of the stock at one side and further equipped with a longitudinally slidable bar having a gripping face disposed in said eye and inclined with respect to the longitudinal axis of the bar, said gripping face having transverse serrations extending in a plane oblique with respect to the longitudinal axis of the bar.

5. A lathe dog comprising a stock having an eye, and a gripping member slidable on the stock in a plane transverse to the major axis of the dog and shaped to provide a gripping face disposed in said eye and inclined with respect to the longitudinal axis of the bar, a spring constantly urging the bar lengthwise to bring its gripping face into operative relation to the work, and a seat or jaw for engaging the work and adjustable on the stock toward and from said gripping face.

6. A gripping device comprising a stock having an eye, a gripping bar slidable lengthwise in bearings on the stock at opposite sides of the eye and so arranged that the gripping surface of the bar is presented to the eye, and a spring constantly urging the bar lengthwise to bring its gripping face into operative engagement with work inserted in the eye.

LEE G. DANIELS.